(12) United States Patent
Ekeroth

(10) Patent No.: US 11,092,507 B2
(45) Date of Patent: Aug. 17, 2021

(54) METHOD OF INDICATING GAS MOVEMENT IN A SCENE

(71) Applicant: FLIR Systems AB, Taby (SE)

(72) Inventor: Lucas Ekeroth, Solna (SE)

(73) Assignee: FLIR SYSTEMS AB, Täby (SE)

( * ) Notice: Subject to any disclaimer, the term of this patent is extended or adjusted under 35 U.S.C. 154(b) by 218 days.

(21) Appl. No.: 16/279,840

(22) Filed: Feb. 19, 2019

(65) Prior Publication Data

US 2019/0187019 A1 Jun. 20, 2019

Related U.S. Application Data

(63) Continuation of application No. PCT/US2017/049494, filed on Aug. 30, 2017.
(Continued)

(51) Int. Cl.
*G01M 3/00* (2006.01)
*G01M 3/38* (2006.01)
(Continued)

(52) U.S. Cl.
CPC .......... *G01M 3/002* (2013.01); *G01J 5/0014* (2013.01); *G01J 5/0022* (2013.01); *G01J 5/025* (2013.01);
(Continued)

(58) Field of Classification Search
CPC ........ G01M 3/002; G01M 3/38; G01J 5/0014; G01J 5/0022; G01J 5/025; G01N 21/3504;
(Continued)

(56) References Cited

U.S. PATENT DOCUMENTS 4,788,428 A * 11/1988 Metcalf ..................... G01J 5/42
250/330
5,656,813 A * 8/1997 Moore ............... G01N 21/3504
250/330
(Continued)

FOREIGN PATENT DOCUMENTS

CN 101122540 2/2008
CN 101251430 8/2008
(Continued)

*Primary Examiner* — Blake C Riddick
(74) *Attorney, Agent, or Firm* — Haynes and Boone, LLP

(57) ABSTRACT

Systems and methods disclosed herein, in accordance with one or more embodiments, provide for indicating gas movement in a scene having a background and an occurrence of gas, and comprise obtaining a sequence of at least two thermal image frames of said scene recorded at different points of time, automatically identifying, in each image frame of said sequence of thermal image frames, a set of pixel coordinates representing gas above a predetermined concentration threshold present in the imaged scene at the point of time at which the image frame was recorded, and automatically determining the location of each of said sets of pixel coordinates in the imaged scene. The systems and methods further comprise at least one of automatically generating a visual presentation image of said scene in which the location of each of said sets of pixel coordinates in relation to the location of each of said other sets of pixel coordinates is visualized, and/or automatically determining a direction of gas movement based on the location of each of said sets of pixel coordinates in relation to the location of each of said other sets of pixel coordinates.

20 Claims, 9 Drawing Sheets

Related U.S. Application Data

(60) Provisional application No. 62/382,193, filed on Aug. 31, 2016.

(51) Int. Cl.
| | | |
|---|---|---|
| *G06T 7/00* | (2017.01) | |
| *H04N 5/225* | (2006.01) | |
| *G01N 21/3504* | (2014.01) | |
| *G06T 11/00* | (2006.01) | |
| *H04N 5/33* | (2006.01) | |
| *G01N 21/65* | (2006.01) | |
| *G01J 5/00* | (2006.01) | |
| *G01J 5/02* | (2006.01) | |
| *G06K 9/00* | (2006.01) | |
| *G01N 21/85* | (2006.01) | |

(52) U.S. Cl.
CPC .......... *G01M 3/38* (2013.01); *G01N 21/3504* (2013.01); *G01N 21/85* (2013.01); *G06K 9/00771* (2013.01); *G06T 7/001* (2013.01); *G06T 11/00* (2013.01); *H04N 5/2258* (2013.01); *H04N 5/33* (2013.01); *G01N 2021/3531* (2013.01); *G01N 2021/8578* (2013.01); *G06T 2207/10048* (2013.01)

(58) Field of Classification Search
CPC ........... G01N 21/85; G01N 2021/3531; G01N 2021/8578; G06K 9/0071; G06K 7/001; G06K 11/00; H04N 5/2258; H04N 5/33; G06T 2207/1048

See application file for complete search history.

(56) References Cited

U.S. PATENT DOCUMENTS

| | | | |
|---|---|---|---|
| 2003/0025081 A1 | 2/2003 | Edner et al. | |
| 2006/0091310 A1* | 5/2006 | Furry | G01N 21/3518 250/330 |
| 2006/0220888 A1* | 10/2006 | Germouni | G06T 7/0008 340/605 |
| 2011/0043536 A1* | 2/2011 | Cobb | G06T 7/215 345/629 |
| 2013/0113939 A1* | 5/2013 | Strandemar | G06T 11/001 348/164 |
| 2014/0061471 A1* | 3/2014 | Li | G01J 5/0014 250/338.5 |
| 2014/0064553 A1* | 3/2014 | Knauth | G06K 9/00771 382/103 |
| 2015/0028208 A1 | 1/2015 | Xu | |
| 2015/0187144 A1* | 7/2015 | Roth | G06T 19/006 345/633 |
| 2016/0097713 A1* | 4/2016 | Kester | G01N 21/3504 356/51 |
| 2017/0138813 A1* | 5/2017 | Xu | G01M 3/226 |
| 2017/0284887 A1* | 10/2017 | Miranda | G06K 9/4661 |

FOREIGN PATENT DOCUMENTS

| | | |
|---|---|---|
| CN | 101846576 | 9/2010 |
| CN | 103674453 | 3/2014 |
| CN | 102636313 | 12/2014 |
| CN | 104977138 | 10/2015 |
| CN | 105447471 | 3/2016 |
| EP | 1257807 | 11/2002 |

\* cited by examiner

METHOD OF INDICATING GAS MOVEMENT IN A SCENE

CROSS-REFERENCE TO RELATED APPLICATIONS

This application is a continuation of International Patent Application No. PCT/US2017/049494 filed Aug. 30, 2017 and entitled "METHOD OF INDICATING GAS MOVEMENT IN A SCENE," which is incorporated herein by reference in its entirety.

International Patent Application No. PCT/US2017/049494 filed Aug. 30, 2017 claims priority to and the benefit of U.S. Provisional Patent Application No. 62/382,193 filed Aug. 31, 2016 and entitled "METHOD OF INDICATING GAS MOVEMENT IN A SCENE," which is hereby incorporated by reference in its entirety.

TECHNICAL FIELD

One or more embodiments of the present disclosure relates generally to gas detection by imaging and more particularly, for example, to indicating gas movement in an imaged scene.

BACKGROUND

Thermal, or infrared (IR), images of scenes are often useful for monitoring, inspection and/or maintenance purposes, e.g. for monitoring gas leaks at industrial plants. Typically, a thermal imaging device, e.g. in the form of a thermography arrangement or an infrared IR camera, is provided to capture infrared (IR) image data values, representing infrared radiation emitted from an observed scene. The captured IR image can after capturing be processed, displayed and/or saved, for example in the thermal imaging device or in a computing device connected to the thermal imaging device such as a tablet computer, a smartphone, a laptop or a desktop computer.

Thermal imaging devices, such as IR cameras, may be used for detecting gas occurrence, for example in the form of a gas cloud or gas plume e.g. from fugitive gas emissions or gas leaks, and for producing a visual representation of such gas occurrence as a gas infrared image. Such a gas infrared image can be used for visualizing gas occurrence or gas leaks, e.g. as smoke or a cloud in images presented on the viewfinder of a camera, on an integrated or separate display, or on an external computing device, thereby allowing the user to see gas occurrence in a scene observed and imaged by means of an IR camera.

However, a problem with conventional systems is that even though gas in an imaged scene is visualized, it is many times very hard for an observer to identify from where the gas is emanating, i.e. to find the source of the gas present in the scene. For instance, the imaged scene may comprise a gas containing pipe with a hole from which gas is leaking into the scene.

There is a need to address the problems of conventional systems to enable a user to more easily identify a gas source using thermal imaging.

SUMMARY

The movement, flow and distribution of gas can be used as an indicator of from where the gas in an imaged scene originates, i.e. to determine a gas source.

Since a single image frame only provides a snapshot of an observed real world scene (hereinafter also referred to as a scene) and any gas present in the scene, it is very hard for a user watching a sequence of such image frames to draw any conclusions on the motion of the gas in the scene. To be able to do so, the user would have to remember several previously watched image frames and make a real-time comparison of the frames. This is why it is often impossible for a user to identify a gas source, e.g. the location of a gas leak, in an observed scene by simply watching an image frame sequence in real-time/on site or in post-analysis.

In one or more embodiments of the disclosure, this problem may be addressed, for example, by a method of indicating gas movement in a scene having a background and an occurrence of gas, which comprises obtaining a sequence of at least two thermal image frames of said scene recorded at different points of time, automatically identifying, in each image frame of said sequence of thermal image frames, a set of pixel coordinates representing gas above a predetermined concentration threshold present in the imaged scene at the point of time at which the image frame was recorded, and automatically determining the location of each of said sets of pixel coordinates in the imaged scene. The method may further comprise at least one of automatically generating a visual presentation image of said scene in which the location of each of said sets of pixel coordinates in relation to the location of each of said other sets of pixel coordinates is visualized, and/or automatically determining a direction of gas movement based on the location of each of said sets of pixel coordinates in relation to the location of each of said other sets of pixel coordinates.

According to embodiments, the output of the method is a visual presentation image of said scene in which the location of each of said sets of pixel coordinates in relation to the location of each of said other sets of pixel coordinates is visualized. According to embodiments, the visualization comprises visualizing said direction of gas movement, e.g. by presenting arrows pointing in the direction of gas movement on the visual presentation image. According to embodiments, the visualization comprises visualizing each of said sets of pixel coordinates using a palette of colors and/or greyscales. Each of said sets of pixel coordinates may in this case according to embodiments be visualized using a different range of colors/greyscales than each of said other sets of pixel coordinates.

According to embodiments, each of the sets of pixel coordinates only comprises pixels which together form a continuous area in the image, the automatic identification of each of the sets of pixel coordinates comprises edge detection, and the visualization only visualizes the edge pixels of the sets of pixel coordinates. In this way only the edges of the gas cloud are visualized, which makes the image easier to interpret for the user.

According to embodiments, a plurality of different sets of pixel coordinates, each representing gas above a specific concentration threshold, are identified in each image frame, and said plurality of different sets of pixel coordinates representing gas above different concentration thresholds are visualized in the same visual presentation image.

According to embodiments, the visual presentation image also visualizes the background of said scene. It is easier for the user to draw conclusions regarding the location of the gas source if e.g. gas containing pipes are shown in the visual presentation image.

According to embodiments, the visual presentation image is a live video image.

According to embodiments, the output of the method comprises, alternatively or additionally, a determined direction of gas movement. The determined direction of gas movement can e.g. be stored in a storage memory, used to trigger an alarm, and/or used for notifying a user.

According to embodiments, the determined direction of gas movement is visualized in the visual presentation image.

According to embodiments, the method further comprises automatically determining at least one potential location of a gas source based on the determined location of each of said sets of pixel coordinates and said determined direction of gas movement. According to embodiments, this determination uses information about the background of the imaged scene, such as information about objects in the scene with a potential to leak gas. The determined potential location of a gas source can e.g. be stored in a storage memory, used to trigger an alarm, and/or used for notifying a user.

According to embodiments, the determined potential location of the gas source is visualized in the visual presentation image.

According to embodiments, the sequence of thermal image frames is stored in a buffer memory, such as a FIFO (first in first out) memory.

Embodiments of the disclosure also include a computer-readable medium for indicating gas movement in a scene having a background and an occurrence of gas, the computer-readable medium comprising stored thereon non-transitory information for performing the method described above, and/or non-transitory information configured to control a processor/processing unit to perform the steps or functions described above.

Embodiments of the disclosure also include a computer program product for indicating gas movement in a scene having a background and an occurrence of gas, the computer program product comprising code portions adapted to control a processor to perform the method described above.

Embodiments of the disclosure also include a system for indicating gas movement in a scene having a background and an occurrence of gas, the system comprising an input and a processor, wherein the input is adapted to obtain a sequence of at least two thermal image frames of said scene recorded at different points of time, and the processor is adapted to automatically identify, in each image frame of said sequence of thermal image frames, a set of pixel coordinates representing gas above a predetermined concentration threshold present in the imaged scene at the point of time at which the image frame was recorded, and automatically determine the location of each of said sets of pixel coordinates in the imaged scene, wherein the processor is further adapted to automatically generate a visual presentation image of said scene in which the location of each of said sets of pixel coordinates in relation to the location of each of said other sets of pixel coordinates is visualized, and/or automatically determine a direction of gas movement based on the location of each of said sets of pixel coordinates in relation to the location of each of said other sets of pixel coordinates.

According to embodiments, the system outputs a visual presentation image of said scene in which the location of each of said sets of pixel coordinates in relation to the location of each of said other sets of pixel coordinates is visualized. According to embodiments, the visualization comprises visualizing said direction of gas movement, e.g. by presenting arrows pointing in the direction of gas movement on the visual presentation image. According to embodiments, the visualization comprises visualizing each of said sets of pixel coordinates using a palette of colors and/or greyscales. Each of said sets of pixel coordinates may in this case according to embodiments be visualized using a different range of colors/greyscales than each of said other sets of pixel coordinates.

According to embodiments, each of the sets of pixel coordinates only comprises pixels which together form a continuous area in the image, the automatic identification of each of the sets of pixel coordinates comprises edge detection, and the visualization only visualizes the edge pixels of the sets of pixel coordinates. In this way only the edges of the gas cloud are visualized, which makes the image easier to interpret for the user.

According to embodiments, a plurality of different sets of pixel coordinates, each representing gas above a specific concentration threshold, are identified in each image frame, and said plurality of different sets of pixel coordinates representing gas above different concentration thresholds are visualized in the same visual presentation image.

According to embodiments, the visual presentation image also visualizes the background of said scene. It is easier for the user to draw conclusions regarding the location of the gas source if e.g. gas containing pipes are shown in the visual presentation image.

According to embodiments, the visual presentation image is a live video image.

According to embodiments, the system alternatively, or additionally, outputs a determined direction of gas movement. The determined direction of gas movement can e.g. be stored in a storage memory, used to trigger an alarm, and/or used for notifying a user.

According to embodiments, the determined direction of gas movement is visualized in the visual presentation image.

According to embodiments, the processor is further adapted to automatically determine at least one potential location of a gas source based on the determined location of each of said sets of pixel coordinates and the determined direction of gas movement. According to embodiments, the processor uses information about the background of the imaged scene, such as information about objects in the scene with a potential to leak gas, in this determination.

The determined potential location of a gas source can e.g. be stored in a storage memory, used to trigger an alarm, and/or used for notifying a user.

According to embodiments, the determined potential location of the gas source is visualized in the visual presentation image.

According to embodiments, the sequence of thermal image frames is stored in a buffer memory, such as a FIFO (first in first out) memory.

In some situations gas spreads rapidly, and completely fills an observed scene before any movement of the gas can be detected, which makes it difficult to determine the source of the gas in the scene. By looking at a visual presentation image in which the location of each set of pixel coordinates is visualized in relation to each of said other sets of pixel coordinates, it is possible to see how the gas was spreading before it completely filled the scene. This can be done at the scene, directly after the recording of the thermal images, or at a later point of time.

If the observed scene fills with gas very rapidly, visualization of the gas movement can be aided by varying the threshold for the predetermined concentration of the gas. Visualization using different gas concentration thresholds may make the spreading of the gas clearer for the user. According to embodiments, the user can select the gas concentration threshold, and may also visualize the spreading of the gas in the visual presentation image using several different concentrations of gas.

Embodiments of the present disclosure provide graphical feedback that assists a user in identifying and locating a gas source in a depicted scene. The graphical feedback may be provided to the user via a GUI presented on a display provided on e.g. a camera or a post-processing device (computer). In embodiments, the graphical feedback is based on information from a set of multiple consecutive image frames, thereby visualizing a memory of the gas movement, flow and/or distribution over the image frames comprised in the set of multiple consecutive images.

Embodiments of the present disclosure provide information about a determined direction of gas movement. The determined direction of gas movement can e.g. be stored in a storage memory, used to trigger an alarm, and/or used for notifying a user. In embodiments, the determined direction of gas movement is visualized in the visual presentation image.

Embodiments of the present disclosure further provide information about a potential location of a gas source. The determined potential location of a gas source can e.g. be stored in a storage memory, used to trigger an alarm, and/or used for notifying a user. It may also be visualized in the visual presentation image.

The sequence of image frames may be stored in a buffer memory, such as a FIFO memory. The buffer memory may store image frames triggered by a certain event, such as the detection of gas in the image, and the storage may be stopped after a certain time, or continued until the buffer memory is full.

In an example embodiment, the size of the buffer memory is selected based on the number of thermal image frames that it is desired to store in the buffer memory. Depending on the distribution speed of the gas, the buffer memory can be selected to store thermal image frames for an appropriate time, such as e.g. 10 seconds, 30 seconds, 10 minutes, one hour or five hours, or be selected to store an appropriate number of thermal image frames. The image frames to be stored may be all image frames in a sequence, or an appropriate selection, e.g. every $2^{nd}$, $10^{th}$, or $100^{th}$ image frame. In this way, all the image frames in the buffer memory could be used for indicating gas movement, without the amount of information to be presented in the visual presentation image being too large. The storage of the image frames may e.g. be triggered by a detection of gas in the image. In one embodiment, the storage may be stopped when the buffer memory is full, so that just the first sequence of image frames after the gas leak is stored. In another embodiment, the storage may replace (e.g. remove or dequeue) image frames beginning with the oldest entries in a FIFO manner when the buffer memory is full, so that the latest recorded image frames are stored in the buffer memory. In another embodiment, the buffer memory may be compacted to make room for one or more latest recorded image frames when the buffer memory is full, e.g. by removing every $n^{th}$ entry in the buffer memory.

Instead of storing the whole image frames in the buffer memory, partial data could be stored, e.g. information representing the gas location and/or gas cloud images (e.g., the edge pixels of gas clouds).

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Introduction

Figure 1:
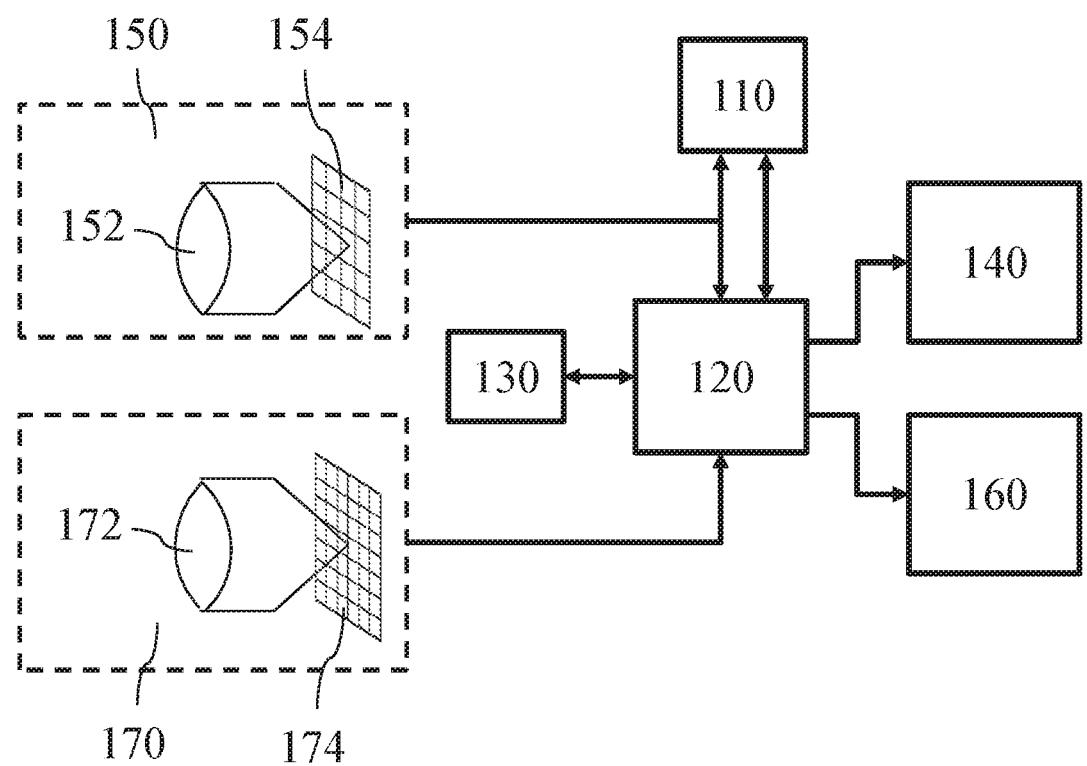
FIG. 1 shows a schematic view of a system in accordance with one or more embodiments of the disclosure.

The disclosure relates to indicating gas movement in a scene having a background and an occurrence of gas. An example of a use case is the inspection with a thermal imaging device of a part of an industrial complex handling gas.

In case there has been a gas leak, a thermal imaging device will be able to detect the gas cloud in the image. However, since a single image frame only provides a snapshot of the scene and any gas present in the scene, it is difficult for a user watching a sequence of such image frames to draw any conclusions on the motion of the gas in the scene. To be able to do so, the user would have to remember several previously watched image frames and make a real-time comparison of the frames. This is why it is often impossible for a user to identify a gas source, e.g. the location of a gas leak, in an observed scene by simply watching an image frame sequence in real-time/on site or in post-analysis.

According to embodiments of the present disclosure, the user receives information about the gas movement. This information may e.g. be in the form of a visual presentation image where the gas movement is visualized. The visualization may comprise visualizing the location of the gas cloud at different points of time, or visualizing the direction of movement of the gas cloud, or both. Based on this visual presentation image, the user may draw conclusions regarding potential locations of the gas source.

The information does not necessarily have to be in the form of a visual presentation image where the gas movement is visualized, however. If the system automatically determines a direction of gas movement, this can be indicated to the user in other ways, such as e.g. via a message to the user. If the system also determines a potential location of a gas source, this can be shown in an image which does not necessarily also visualize the movement of the gas, or presented to the user in other ways, such as using text or graphic symbols.

The thermal images may be obtained by any type of thermal or infrared imaging device, as long as the imaging device can detect the gas. Different gases have different absorption wavelengths, and the spectral sensitivity range of the imaging device should preferably correspond to the gas to be detected. Methods of gas imaging are e.g. described in co-pending U.S. Provisional Patent Application Nos. 62/127,247 and 62/127,264, which are hereby incorporated by reference in their entirety.

The imaging device may be static, e.g. stationary mounted, or moving. If the imaging device is static, it is easier for the processor to determine a direction of movement, since the field of view of the images will always be the same.

If the imaging device is moving, the location of the gas is determined using any of the algorithms known in the art for determination or tracking of the location of an object in a sequence of moving images, e.g. determining the location of the gas in relation to a common reference point in the sequence of images or based on optical flow.

If the background is constant, it is also easier to provide the processor with information about the background to be used for e.g. determining a potential location of a gas source.

The processor may in some embodiments comprise several different processors which together perform the claimed functions.

System Embodiments

FIG. 1 shows a schematic view of a system according to one or more embodiments of the disclosure. The system comprises a thermography arrangement or infrared IR camera that is configured to capture infrared (IR) image data values, representing infrared radiation emitted from a scene by an infrared (IR) imaging system 150. The IR imaging system 150 employs an infrared (IR) optical system 152, e.g. comprising a lens, zoom functionality and focus functionality, together with a corresponding IR detector 154, for example comprising a micro-bolometer focal plane array, to provide an IR image in the form of a signal frame of IR image data values, representing infrared radiation emitted from a scene. The infrared (IR) imaging system 150 may be arranged to send the signal frames of IR image data values to a processor 120, and optionally also to a buffer memory 110, such as a FIFO (first in first out) memory.

The buffer memory 110 may be a bounded buffer, cache, or other appropriate memory implemented in a hardware memory component (e.g., as a hardwired memory device or a programmable logic device configured as a memory device), software (e.g., as data structures in a memory or storage component), or a combination of both, in which the sequence of thermal image frames is stored in a FIFO manner. The size of the buffer memory 110 may be selected based on the number of thermal image frames that it is desired to store in the buffer memory 110. Depending on the distribution speed of the gas, the buffer memory 110 can be selected to store thermal image frames for an appropriate time, such as e.g. 10 seconds, 30 seconds, 10 minutes, one hour or five hours, or be selected to store an appropriate number of thermal image frames. The image frames to be stored may be all image frames in a sequence, or an appropriate selection, e.g. every $2^{nd}$, $10^{th}$, or $100^{th}$ image frame. In this way, all the image frames in the buffer memory 110 could be used for indicating gas movement, without the amount of information to be presented in the visual presentation image being too large. The storage of the image frames may e.g. be triggered by a detection of gas in the image. In some embodiments, the storage may be stopped when the buffer memory 110 is full, so that just the first sequence of image frames after the gas leak is stored. In some embodiments, the storage may replace (e.g. remove or dequeue) image frames beginning with the oldest entries in a FIFO manner when the buffer memory 110 is full, so that the latest recorded image frames are stored in the buffer memory 110. The buffer memory 110 may be compacted to make room for one or more latest recorded image frames when the buffer memory 110 is full, e.g. by removing every $n^{th}$ entry in the buffer memory 110.

Instead of storing the whole image frames in the buffer memory, partial data could be stored, e.g. information representing the gas location and/or the edge of the gas cloud.

The processor 120 may be provided with specifically designed programming or program code portions adapted to control the processor 120 to perform the operations and functions of embodiments of various methods described herein. The processor 120 may be arranged to retrieve images and/or other data for processing from the buffer memory 110.

The system may further comprise at least one storage memory 130 configured to store data values or parameters received from the processor 120 or to retrieve and send image data values or parameters to the processor 120. Buffer memory 120 and storage memory 130 may be implemented in a same hardware memory device, separate hardware memory devices, or distributed among two or more hardware memory devices, according to different embodiments.

The shown system further comprises a visible light (VL) imaging system 170 that is configured to capture visible light (VL) image data values, representing VL emitted from a scene, but this is not necessarily used in the disclosed method. The VL imaging system employs an visible light (VL) optical system 172, e.g. comprising a lens, zoom functionality and focus functionality, together with a corresponding VL detector 174, for example comprising a digital charge-coupled device (CCD) or complementary metal-oxide-semiconductor (CMOS) active pixel sensors, to provide an VL image in the form of a signal frame of VL image data values, representing VL emitted from a scene. The VL imaging system 170 may be arranged to send the signal frames VL image data values to processor 120, e.g. for creating a fusion image, containing a combination of both thermal information and visual information.

An exemplary embodiment of the operation of such a system, such as an IR camera, is generally as follows: Infrared energy is accepted via the infrared optical system 152 and directed onto the IR detector elements 154. Each detector element responds to the infrared radiation or heat energy received. A frame of infrared (IR) image data values may, for example, be captured by scanning all the rows and columns of the detector and, in some embodiments, analog to digital converted to obtain a captured IR image wherein image data values associated to each detector element is referred to as an IR image data value having an associated row and column index.

The VL imaging system 170 may be adapted to capture electromagnetic radiation in other non-thermal wavelengths in addition to or in place of visible light wavelengths. For example, the VL imaging system 170 may be configured to capture near-infrared (NIR) light, short wave infrared (SWIR) light, ultra-violet (UV) light, or other non-thermal light in addition to or in place of visible light. For such embodiments, the VL imaging system 170 may represent a non-thermal imaging system comprising a non-thermal optical system (represented by the VL optical system 172) and a non-thermal detector (represented by the VL detector 174) responsive to non-thermal radiation. For example, electron multiplying CCD (EMCCD) sensors, scientific CMOS (sCMOS) sensors, intensified charge-coupled device (ICCD) sensors, as well as CCD-based and CMOS-based sensors discussed above and/or other suitable sensors, may be used to implement the non-thermal detector (represented by the VL detector 174) to detect NIR light, SWIR light, and/or other non-thermal light.

In one or more embodiments, the system further comprises a display 140 and/or a printer 160 configured to receive a signal from the processor 120 and to display the received signal as a user-viewable image, e.g. to a user of the system. In one or more embodiments, the display 140 is provided in an image-presenting unit. In one or more embodiments, the display 140 is integrated with a user input device configured to receive user input signals or indications from a user.

In one or more embodiments, the processor 120 is further arranged to send the received IR image as a signal frame of IR image data values to an external processor unit (not shown in FIG. 1).

In one or more embodiments, the processor 120 may be a processor such as a general or specific purpose processor unit for example a microprocessor, microcontroller or other control logic that comprises sections of code or code portions, stored on a computer readable storage medium, such as the storage memory 130, that are fixed to perform certain tasks but also other alterable sections of code, stored on a computer readable storage medium, that can be altered during use. Such alterable sections of code can comprise parameters that are to be used as input for the various tasks, such as the calibration of the system, adaption of the sample rate or the filter for the spatial filtering of the images, or any other parameter related operations known to a person skilled in the art.

In one or more embodiments, the processor 120 is configurable using a hardware description language (HDL).

In one or more embodiments, the processor 120 is a field-programmable gate array (FPGA), i.e. an integrated circuit designed to be configured by the customer or designer after manufacturing and configurable using a hardware description language (HDL). For this purpose, embodiments of the disclosure may comprise configuration data configured to control an FPGA to perform the operations and functions of the method embodiments described herein.

In this document, the terms "computer program product" and "computer-readable storage medium" may be used generally to refer to media such as the storage memory 130 or the storage medium of processor 120 or an external storage medium. These and other forms of computer-readable storage media may be used to provide instructions to processor 120 for execution. Such instructions, generally referred to as "computer program code" (which may be grouped in the form of computer programs or other groupings), when executed, enable the system to perform features or functions of embodiments of the disclosure. Further, as used herein, "logic" may include hardware, software, firmware, or a combination of thereof. The system further comprises a display 140 and/or a printer 160, for displaying and/or printing the second fused image.

Method Embodiments

Figure 2A:
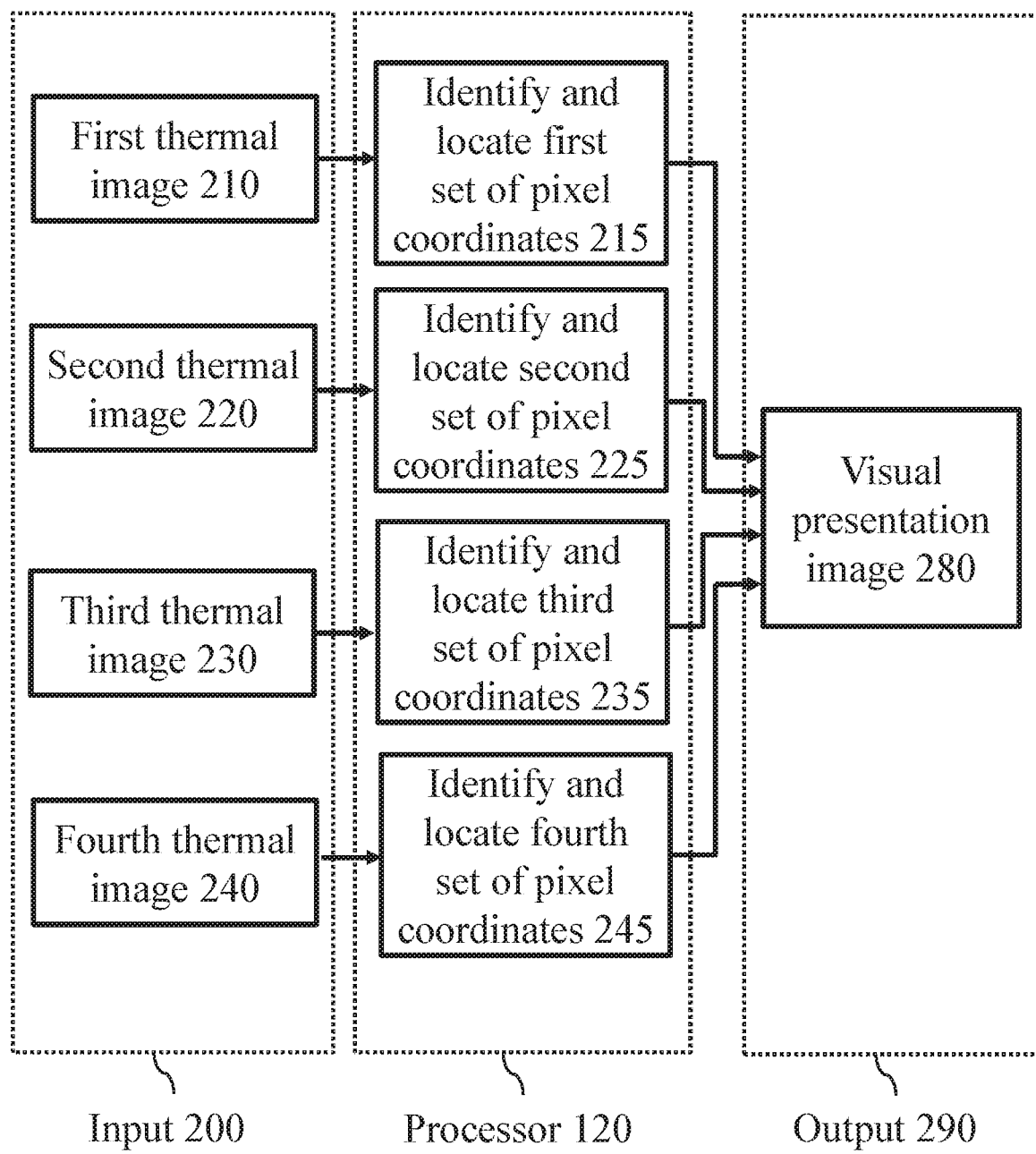
FIGS. 2a-2c show flow diagrams of methods of indicating gas movement in a scene in accordance with embodiments of the disclosure.
Figure 2B:
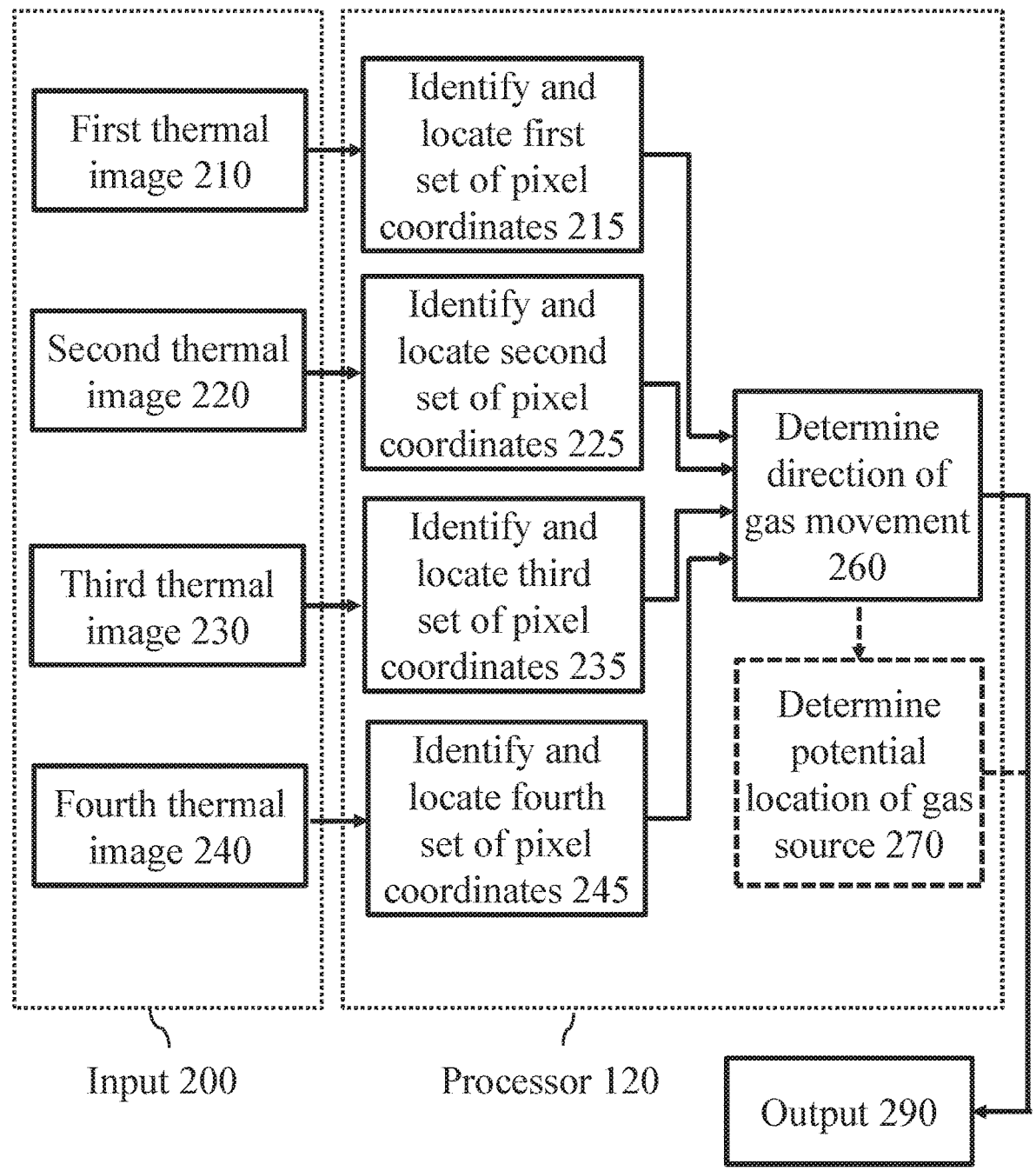
Figure 2C:
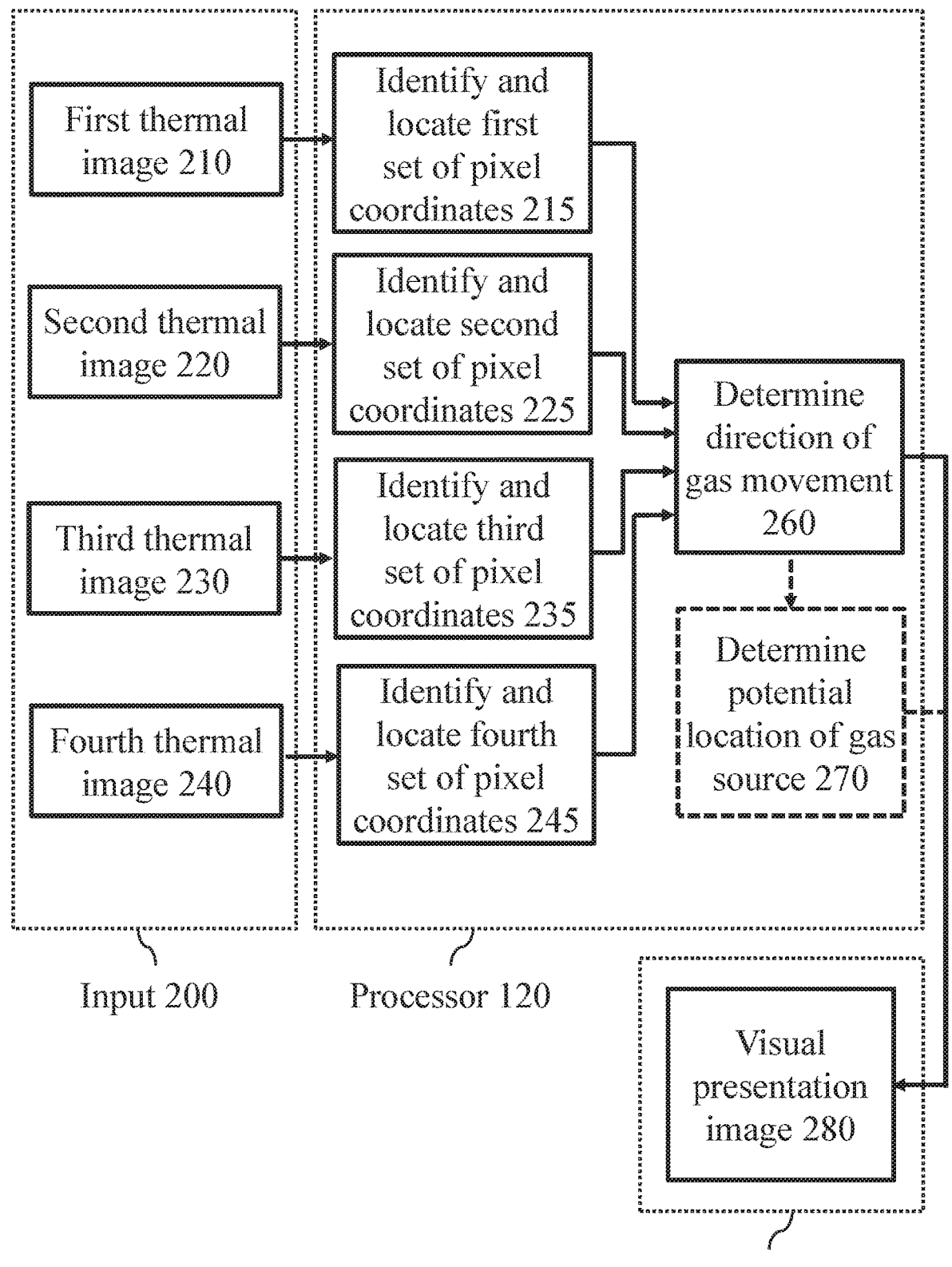

FIGS. 2a-2c show flow diagrams of methods of indicating gas movement in a scene in accordance with embodiments of the disclosure. A sequence of thermal image frames of a scene recorded at different points of time are obtained by input 200 and sent to processor 120. Input 200 may, as shown in FIG. 1, comprise several different input devices, such as an IR imaging system 150 providing the thermal image frames 210, 220, 230, 240, a buffer memory 110, a storage memory 130, and possibly also a VL imaging system 170. Input 200 may also comprise other types of storage or processing devices. For each thermal image frame 210, 220, 230, 240, the processor 120 automatically identifies 215, 225, 235, 245 a set of pixels (e.g., pixel coordinates) representing gas present in the imaged scene at the point of time at which the image frame was recorded, and also automatically determines 215, 225, 235, 245 the location of each of the sets of pixels or pixel coordinates in the imaged scene. In the figures, four image frames 210, 220, 230, 240 are shown, but the method can be applied to any number of image frames, as long as there are at least two.

According to the one or more embodiments of FIG. 2a, the processor 120 automatically generates a visual presentation image 280 of the scene in which the location of each of the sets of pixel coordinates in relation to the location of each of the other sets of pixel coordinates is visualized. For example, a visual presentation image 280 may be generated to include an indication (e.g., a visual indication such as images or edges of gas clouds) of the areas in the scene corresponding to the respective sets of pixels representing gas present above a predetermined concentration threshold in the scene at the different points in time. The output 290 of the system of FIG. 2a may thus be a display 140 or printer 160 which displays or otherwise provides a visual presentation image 280 in which the location of each of the sets of pixel coordinates in relation to the location of each of the other sets of pixel coordinates is visualized.

According to the one or more embodiments of FIG. 2b, the processor 120 further automatically determines 260 the direction of gas movement, based on the location of each of the sets of pixel coordinates in relation to the location of each of the other sets of pixel coordinates. For example, the direction of gas movement may be determined based on relative positions of the areas in the scene corresponding to the respective sets of pixels representing gas present above a predetermined concentration threshold in the scene at the different points in time. The output 290 of the system of FIG. 2b is thus the determined direction of gas movement.

According to embodiments, the processor 120 further automatically determines 270 at least one potential location of a gas source based on the determined location of each of the sets of pixel coordinates in relation to the location of each of the other sets of pixel coordinates and the determined direction of gas movement. The output 290 of the system of FIG. 2b may then instead, or additionally, be the determined potential location of a gas source. According to embodiments, the determined potential location of the gas source is visualized in the visual presentation image. The visual presentation image may e.g. be a stored image showing the scene, or a current live image frame, in which the determined potential location of the gas source may be indicated.

According to embodiments, the determination of at least one potential location of a gas source includes using information about the background of the imaged scene. The processor may have information about objects in the scene with a potential to leak gas, such as e.g. pipes, and may then use this information together with the determined location of each of the sets of pixel coordinates in relation to the location of each of the other sets of pixel coordinates and the determined direction of gas movement to determine at least one potential location of a gas source.

Visualization of the location of each of the sets of pixel coordinates in relation to the location of each of the other sets of pixel coordinates may comprise visualizing a direction of gas movement. The gas movement may in that case be automatically determined by the processor based on the location of each of the sets of pixel coordinates in relation to the location of each of the other sets of pixel coordinates. The visual presentation image may e.g. be a stored image showing the scene or a current live image frame, in which information about the direction of gas movement may be visualized, e.g. by presenting arrows pointing in the direction of gas movement.

Alternatively or additionally, the visualization of the location of each of the sets of pixel coordinates in relation to the location of each of the other sets of pixel coordinates may comprise visualizing each of the sets of pixel coordinates (e.g., as images of gas clouds) using a palette of colors and/or greyscales. According to embodiments, each of the sets of pixel coordinates is then visualized using a different range of colors/greyscales than each of the other sets of pixel coordinates. For example, the gas cloud images corresponding to the respective sets of pixels representing gas may each be displayed in a different range of colors and/or greyscales. The visual presentation image may e.g. be a stored image showing the scene or a current live image frame, in which graphical objects representing e.g. the gas cloud location, the gas cloud edge, the direction of gas movement, and/or a potential location of a gas source may be superimposed. Depending on embodiments, the current live image frame display a background of the scene based on a live thermal image frame captured by an IR imaging device (e.g., IR imaging system 150, a live VL image frame captured by a VL imaging device (e.g., VL imaging system 170), or a combined image frame of the live IR and VL image frames.

According to the one or more embodiments of FIG. 2c, the processor 120 both automatically generates a visual presentation image 280 of the scene in which the location of each of the sets of pixel coordinates in relation to the location of each of the other sets of pixel coordinates is visualized, and automatically determines 270 at least one potential location of a gas source based on the determined location of each of the sets of pixel coordinates in relation to the location of each of the other sets of pixel coordinates and the determined direction of gas movement. The output 290 of the system of FIG. 2c is thus both a visual presentation image 280 in which the location of each of the sets of pixel coordinates in relation to the location of each of the other sets of pixel coordinates is visualized, and the determined direction of gas movement.

Figure 3:
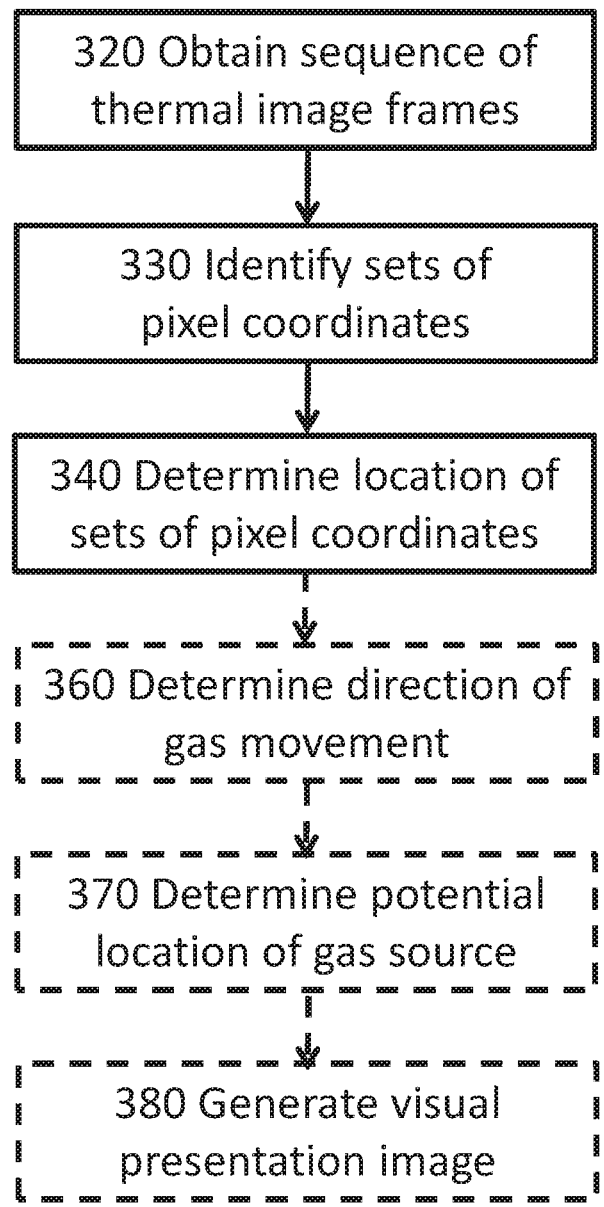
FIG. 3 shows a flow chart of a method of indicating gas movement in a scene in accordance is with one or more embodiments of the disclosure.

FIG. 3 is a flow chart of a method of indicating gas movement in a scene having a background and an occurrence of gas, in accordance with one or more embodiments of the disclosure. In one or more embodiments, the method comprises:

In block 320: obtaining a sequence of at least two thermal image frames of the scene recorded at different points of time. The thermal image frames may e.g. be obtained from a buffer memory 110.

In block 330: identifying, in each image frame of the sequence of thermal image frames, a set of pixels (e.g., pixel coordinates) representing gas present in the imaged scene at the point of time at which the image frame was recorded. In some embodiments, a set of pixels representing gas in the scene may be identified based on the change in IR radiation intensity (due to absorption or emission of IR radiation by gas) which indicates that a certain gas or gases of interest (e.g., depending on IR emission/absorption spectra) may be present above a predetermined concentration threshold. For example, pixels capturing IR radiation intensity levels that differ from the IR radiation intensity level of the background by more than a certain degree likely represent those pixels that are imaging gas present above a certain concentration level and can be identified as such. The identification of the set of pixels or pixel coordinates may e.g. be performed automatically by a processor, such as processor 120.

In embodiments, the identification of the set of pixel coordinates takes place before storage in the buffer memory 110, so that partial data, e.g. the information representing the gas location and/or the edge of the gas cloud, is stored in the buffer memory 110 instead of the whole image frames being stored. For example, gas cloud images each based on the respective set of pixels representing gas may be generated in some embodiments, and the generated gas cloud images may be inserted into and removed from a buffer memory in a first-in first-out (FIFO) manner. In such embodiments, visual presentation image of the scene may be generated at least by superimposing the gas cloud images that are currently stored in the buffer memory (e.g., including recently generated and stored gas cloud images but not those gas cloud images that have been removed from the buffer memory).

In block 340: determining the location of each of the sets of pixel coordinates in the imaged scene. For example, a corresponding area in the scene may be determined for each of the sets of pixels representing gas present above the predetermined concentration threshold. If the imaged part of the scene in the sequence of thermal images remain substantially the same (e.g., in embodiments where the field-of-view (FOV) of the IR camera is substantially fixed, such as in a stationary IR camera application), the determination of the corresponding location/area in the imaged scene may achieved simply by receiving the sets of pixel coordinates. If the IR camera moves or the FOV of the IR camera otherwise changes (e.g., in embodiments where a portable IR camera may be used to capture the sequence of thermal images), the determination of the corresponding location/area in the imaged scene may involve tracking the changes in the FOV (e.g., due to the motion of the IR camera) to determine the changes in the association between pixel coordinates and locations in the scene for the sequence of image frames captured at different times. In this way, for example, images/edges of gas clouds of gas may be presented at appropriate locations in the imaged scene even if the FOV changes in the sequence of thermal images captured at different times. The determining of the corresponding location/area in the scene may e.g. be performed automatically by a processor, such as processor 120.

In some embodiments, the method further comprises:

In block 380: generating a visual presentation image of the scene in which the location of each of the sets of pixel coordinates in relation to the location of each of the other sets of pixel coordinates is visualized. The generating of the visual presentation image may e.g. be performed automatically by a processor, such as processor 120, for viewing by a user on a display, such as output 290.

In one or more embodiments, the visualization comprises visualizing the direction of gas movement, e.g. by presenting arrows pointing in the direction of gas movement on the visual presentation image. According to embodiments, the visualization comprises visualizing each of the sets of pixel coordinates using a palette of colors and/or greyscales. Each of the sets of pixel coordinates may in this case according to embodiments be visualized using a different range of colors/greyscales than each of the other sets of pixel coordinates.

According to embodiments, the generating of the visual presentation image may include generating gas cloud images (e.g., visualizing gas clouds) corresponding to the sets of pixel coordinates representing gas. In some embodiments, this may comprise performing edge detection on the sets of pixel coordinates representing gas (e.g., to detect edge pixels from the sets of pixel coordinates representing gas), and the generating of the visual presentation image may only visualize the edge pixels of the sets of pixel coordinates. In this way, only the edges of the gas clouds are visualized, which makes the image easier to interpret for the user. In some embodiments, the identified sets of pixel coordinates comprise only the pixels which together form a continuous (e.g., contiguous) area in the image, for example, to facilitate the detection of edges of the gas clouds.

According to embodiments, the visual presentation image also visualizes the background of the scene. It is easier for the user to draw conclusions regarding the location of the gas source if e.g. gas containing pipes are shown in the visual presentation image.

The visual presentation image may e.g. be a stored image showing the scene or a current live image frame. In the visual presentation image, graphical objects representing e.g. the gas cloud location, the gas cloud edge, the direction of gas movement, and/or a potential location of a gas source may be superimposed.

In some embodiments, the method additionally or alternatively comprises:

In block 360: determining a direction of gas movement based on the location of each of the sets of pixel coordinates in relation to the location of each of the other sets of pixel coordinates. The determining of the direction may e.g. be performed automatically by a processor, such as processor 120.

The determined direction of gas movement can e.g. be stored in storage memory 130, used to trigger an alarm, and/or used for notifying a user. If the determined direction of gas movement is stored in storage memory 130, it is possible to analyze it at a later stage to statistically determine how gas spreads in the specific scene. In some situations it may e.g. be desired that the gas spreads along a certain path to end up in a specific location. In some situations where gas normally spreads in a room, such as e.g. in a delivery room where nitrous oxide (laughing gas) is used, an analysis of how the gas spreads can be used to plan ventilation or give directions on which parts of the room the staff should avoid. The same could be done e.g. around gas stations or in mines, to analyze how the gas normally moves and spreads.

According to embodiments, the determined direction of gas movement is visualized in the visual presentation image.

According to embodiments, the method additionally or alternatively comprises:

In block 370: determining at least one potential location of a gas source based on the determined location of each of the sets of pixel coordinates and the determined direction of gas movement. The determining of the at least one potential location may e.g. be performed automatically by a processor, such as processor 120.

According to embodiments, this determination uses information about the background of the imaged scene, such as information about objects in the scene with a potential to leak gas. The determined potential location of a gas source can e.g. be stored in a storage memory, used to trigger an alarm, and/or used for notifying a user.

According to embodiments, the determined potential location of the gas source is visualized in the visual presentation image.

The method may comprise either of blocks 360 or 380, or any combination of some or all of blocks 360, 370 and 380.

Visualizations

Figure 4:
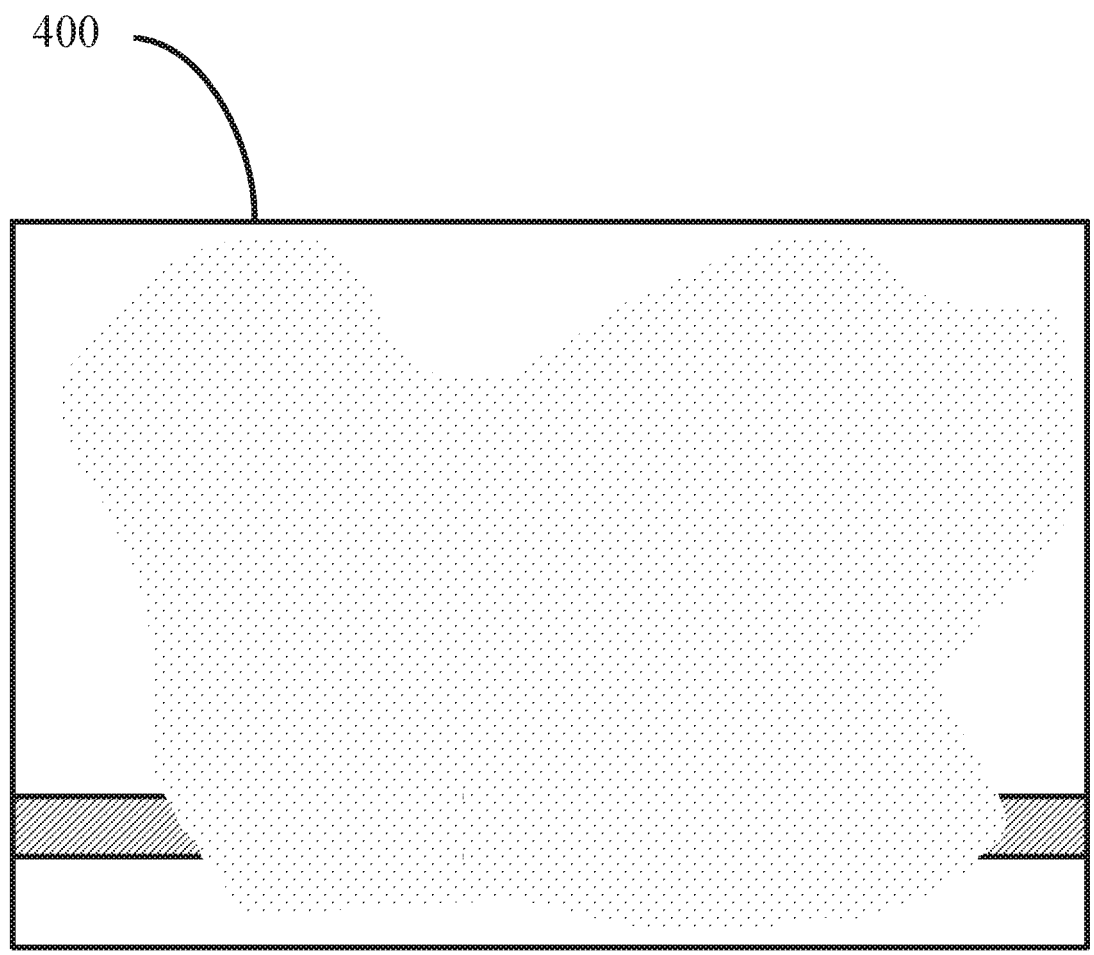
FIG. 4 shows an example of an imaged scene obtained without the techniques according to embodiments of the disclosure to provide gas movement indication.

FIG. 4 shows an example of an image 400 of a scene comprising gas. This image 400 illustrates the problems associated with detecting the gas source when the gas has spread and almost completely fills the observed scene.

Figure 5:
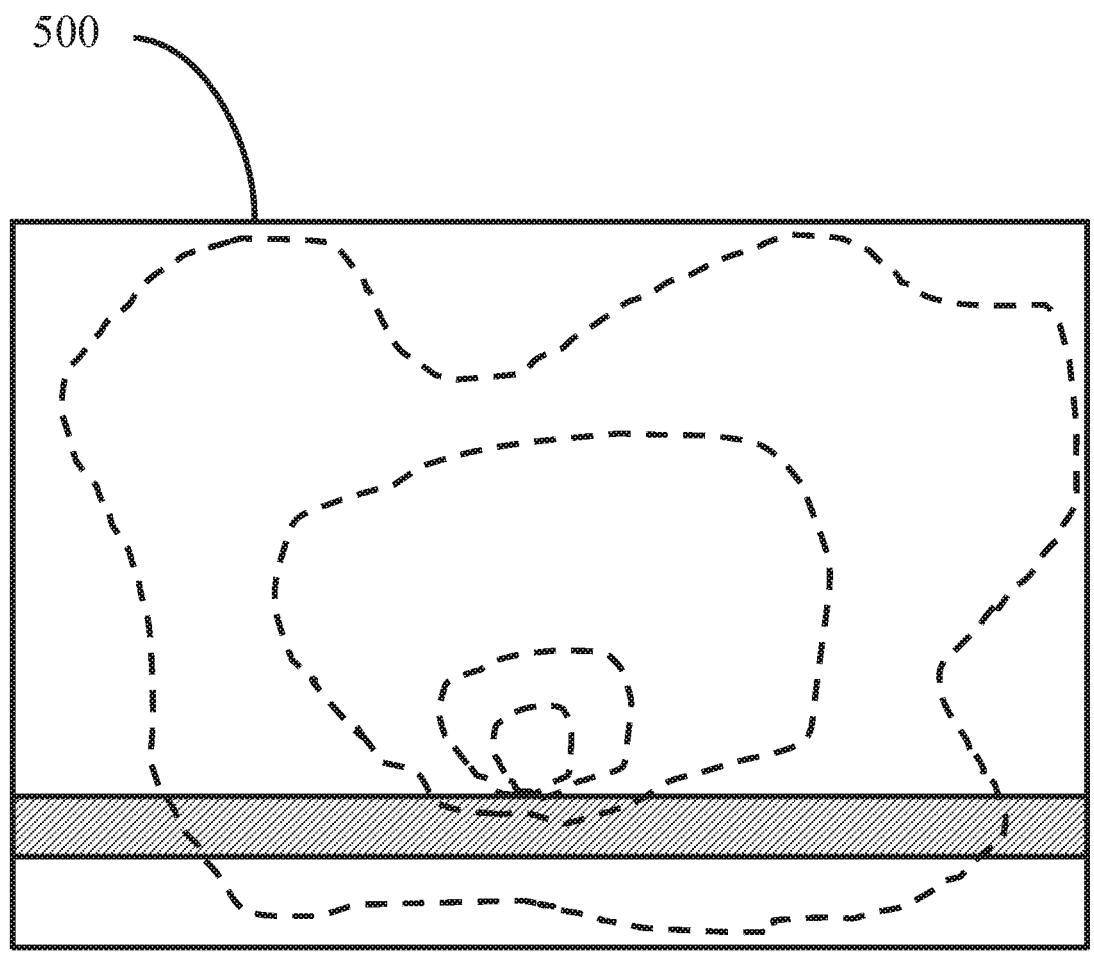
FIG. 5 shows an example of a visual presentation image of a scene having a background and an occurrence of gas, obtained by a method for indicating gas movement in a scene, in accordance with one or more embodiments of the disclosure.

FIG. 5 shows an example of a visual presentation image 500 of a scene having a background and an occurrence of gas, obtained by a method for indicating gas movement in a scene in accordance with one or more embodiments of the disclosure. In this visual presentation image 500, the location of each set of pixel coordinates in relation to each of the other sets of pixel coordinates is visualized by showing only the edges of the gas cloud at different points of time. This makes it clear to the user how the gas has moved over time.

Figure 6:
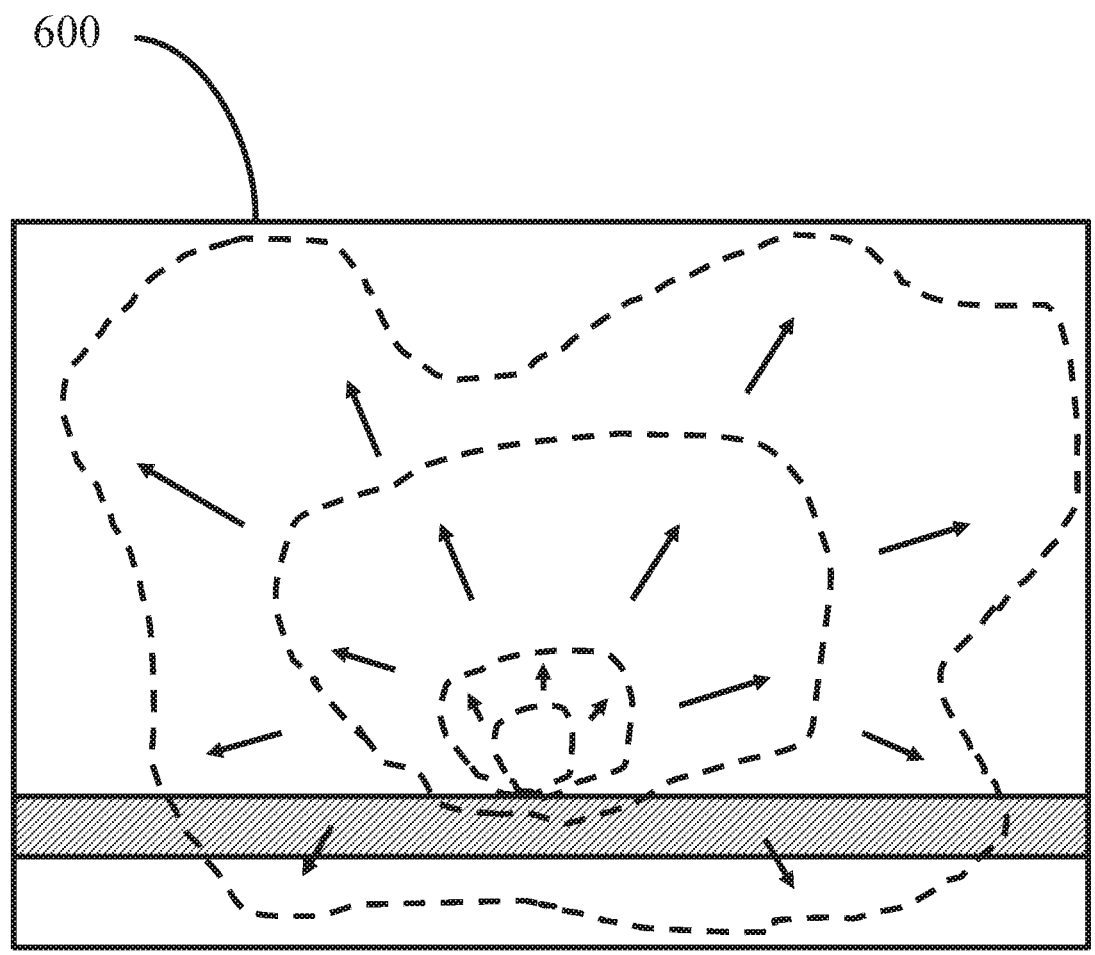
FIG. 6 shows an example of a visual presentation image of a scene having a background and an occurrence of gas, obtained by a further method for indicating gas movement in a scene, in accordance with one or more embodiments of the disclosure.

FIG. 6 shows an example of a visual presentation image 600 of a scene having a background and an occurrence of gas, obtained by a further method for indicating gas movement in a scene in accordance with one or more embodiments of the disclosure. In this visual presentation image 600, the same gas cloud edges as in FIG. 5 are shown, but in addition the direction of gas movement has been visualized by presenting arrows pointing in the direction of gas movement on the visual presentation image. This makes it even clearer to the user how the gas has moved over time.

Figure 7:
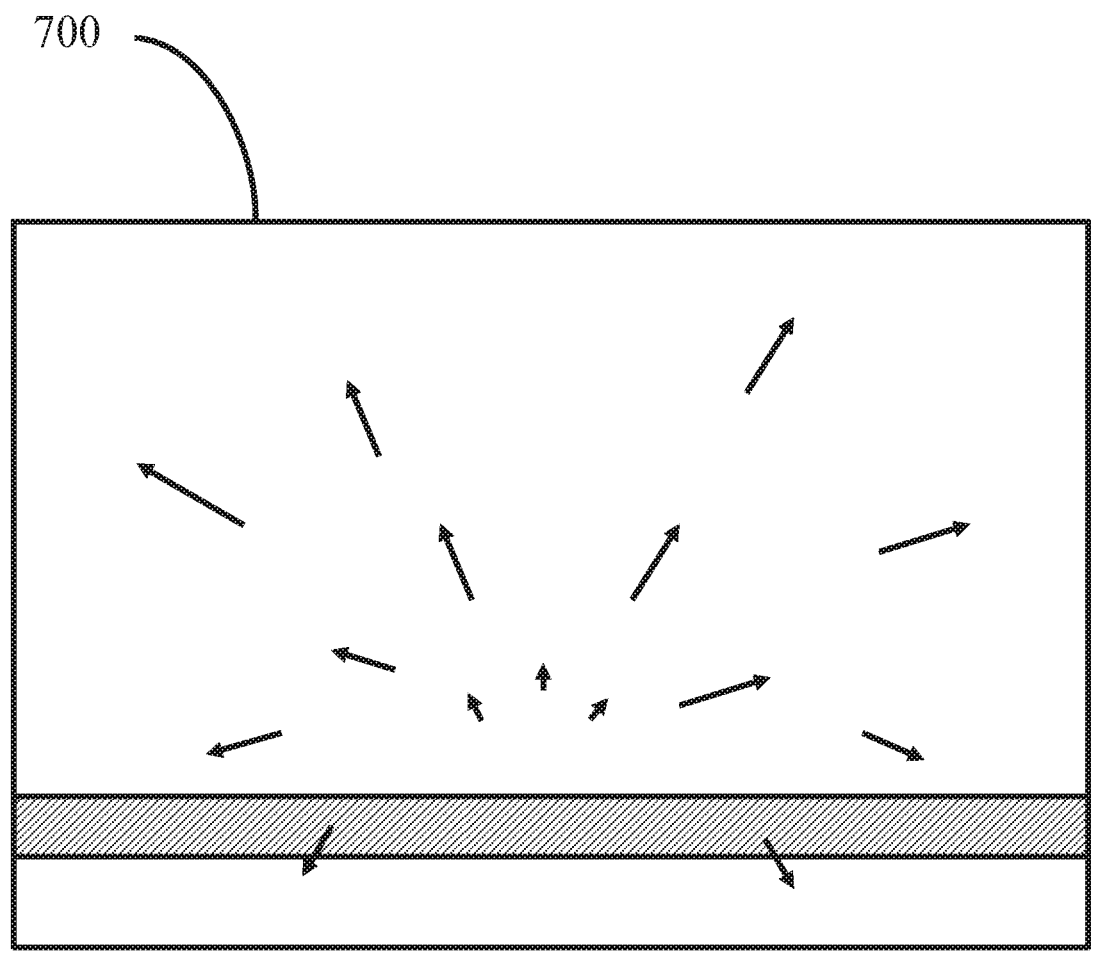
FIG. 7 shows an example of a visual presentation image of a scene having a background and an occurrence of gas, obtained by a further method for indicating gas movement in a scene, in accordance with one or more embodiments of the disclosure.

FIG. 7 shows an example of a visual presentation image 700 of a scene having a background and an occurrence of gas, obtained by a further method for indicating gas movement in a scene, in accordance with one or more embodiments of the disclosure. In this visual presentation image 700, the same arrows pointing in the direction of gas movement as in FIG. 6 are shown, but without the gas cloud being visualized. In some situations, this makes the gas movement clearer to the user.

In one or more embodiments, the user can select which visualization method to use, and switch between the different alternatives to get the clearest possible gas movement visualization in each situation.

In one or more embodiments, the user also has alternatives for the visualization of the gas cloud. For example, either the whole gas cloud or just the edges could be visualized in the image. Further, the cloud could have one color and the edges another color. Gas clouds at different points of time could be visualized using different colors.

The visual presentation image may be any type of image that the user can interpret. In embodiments, the visual presentation image is a thermal image (e.g., the background is shown as a thermal image). In embodiments, the visual presentation image is a visible light (VL) image (e.g., the background is shown as a VL image). In embodiments, the visual presentation image is a fusion image, containing both thermal information and VL information. In one or more embodiments, the user can select which image type to use, and switch between the different alternatives to get the clearest possible gas movement visualization in each situation.

As thermal images by nature are generally low contrast and noisy, the captured IR image may be subjected to various imaging processing in order to improve the interpretability of the image before displaying it to a user. Examples of such image processing is correction with IR temperature calibration data parameters, low pass filtering, registration of multiple successive IR image or gas images and averaging to obtain an averaged IR image or gas image or any other IR image or gas image processing operation known to a person skilled in the art.

As infrared radiation is not visible to the human eye there are no natural relations between the captured IR image's or gas image's data values of each pixel in an IR image or gas image and the greyscale or the colors displayed on a display. Therefore, an information visualization process referred to as false coloring or pseudo coloring may be used to map image data values or pixel values of each pixel in an IR image or gas-absorption-path-length to a palette used to present the corresponding pixel displayed on a display, e.g. using grey-scale or colors.

A palette is typically a finite set of color or grey-scale representations selected from a color model for the display of images or visual representations of IR images/gas-absorption-path-length images, i.e. a pre-defined palette represents a finite set of grayscale or color values of a color model displayable on a display thereby making it visible to the human eye. Mapping of captured infrared (IR) image data values of each pixel in an IR image, or gas image data values of each pixel in a gas image, to a palette used to present the corresponding pixel of a visual representation of the IR image displayed on a display is typically performed by applying a pre-determined relation. Such a pre-determined relation typically describes a mapping from image data values or pixel values to the pre-defined palette, e.g. a palette index value with an associated color or grey-scale representation selected from a color model. The gas visualizing IR image is typically displayed to an intended user based on the data values or pixel values of each pixel, optionally IR temperature calibration data parameters, a predefined palette representing a finite set of grayscale or color values of a color model displayable on a display and a pre-determined relation describing a mapping from infrared image data values to the pre-defined palette.

The processor 120 of the described system is, in accordance with one or more embodiments, configured to perform a selection of any or all of the method steps described herein that are associated with processing of captured IR images comprising image data values or pixel values, such as selection of data values/pixel values, mapping of temperature values associated with the data values/pixel values to color and/or grayscale values, assigning each pixel of a frame of IR data values a representation value from a preselected color model, e.g. based on the associated temperature value of the pixel, and other operations described herein.

Additional Aspects of the Inventive Concept

In one or more embodiments, there is provided a computer-readable medium on which is stored:

non-transitory information for performing a method according to any of the embodiments described herein; and/or non-transitory information configured to control a processor/processing unit to perform the steps or functions of any of the embodiments described herein.

In one or more embodiments, there is provided a computer program product comprising code portions adapted to control a processor to perform any of the steps or functions of any of the embodiments described herein. Software in accordance with the present disclosure, such as program code portions and/or data, can be stored in non-transitory form on one or more machine-readable mediums. It is also contemplated that software identified herein can be implemented using one or more general purpose or specific purpose computers and/or computer systems, networked and/or otherwise.

Where applicable, one or more embodiments provided by the present disclosure can be implemented using hardware, software, or combinations of hardware and software. Also where applicable, the various hardware components and/or software components set forth herein can be combined into composite components comprising software, hardware, and/or both. Where applicable, the various hardware components and/or software components set forth herein can be separated into sub-components comprising software, hardware, or both. In addition, where applicable, it is contemplated that software components can be implemented as hardware components, and vice-versa. Where applicable, the ordering of various steps described herein can be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. For example, the processor may comprise several different processors which together perform the claimed functions. The processor may be a part of the thermal imaging device used to record the thermal image frames, or one or more separate processors in e.g. a computer. Accordingly, the scope of the invention is defined only by the claims.

The invention claimed is:

1. A method of indicating gas movement in an imaged scene having a background and an occurrence of gas, the method comprising:

obtaining a sequence of at least two thermal image frames of said scene recorded at different points of time;

automatically identifying, in each image frame of said sequence of thermal image frames, a set of pixel coordinates representing gas above a predetermined concentration threshold present in the imaged scene at the point of time at which the image frame was recorded;

automatically determining a location of each of said sets of pixel coordinates in the imaged scene;

performing edge detection on each of said sets of pixel coordinates to determine, for each set of pixel coordinates of said sets of pixel coordinates, a respective location in the imaged scene of an edge of the gas at the point of time associated with said set of pixel coordinates; and generating a visual presentation image of said scene in which the location of the edge of the gas in the imaged scene at each point of time is visualized in the visual presentation image.

2. The method according to claim 1, further comprising:
automatically determining a direction of gas movement based on the location of each of said sets of pixel coordinates in the imaged scene; and
automatically determining at least one potential location of a gas source based on said determined location of each of said sets of pixel coordinates and said determined direction of gas movement.

3. The method according to claim 2, wherein said determination of said at least one potential location of said gas source uses information about the background of the imaged scene, wherein the information about the background comprises information about objects in the scene with a potential to leak the gas, and the method further comprises visualizing said at least one potential location of said gas source in said visual presentation image of said scene.

4. The method according to claim 1, further comprising automatically determining a direction of gas movement based on the location of each of said sets of pixel coordinates in the imaged scene, wherein the visual presentation image includes arrows pointing in the direction of gas movement.

5. The method according to claim 1, wherein each of said sets of pixel coordinates is visualized in the visual presentation image using a respective range of colors and/or greyscales.

6. The method according to claim 1, wherein:
each of said sets of pixel coordinates only comprises pixels which together form a continuous area in the image; and
for each of said sets of pixel coordinates, the edge of the gas at the point of time associated with said set of pixel coordinates is formed of edge pixels of said sets of pixel coordinates.

7. The method according to claim 1, wherein:
a plurality of different sets of pixel coordinates, each representing gas above a specific concentration threshold, are identified in each image frame; and
said plurality of different sets of pixel coordinates representing gas above different concentration thresholds are visualized in the same visual presentation image.

8. The method according to claim 1, wherein said visual presentation image also visualizes the background of said scene and is a live video image, wherein said sequence of thermal image frames is stored in a buffer memory, and wherein the method further comprises determining, based on a distribution speed of the gas, a number of thermal image frames to store in the buffer memory.

9. A computer program product for indicating gas movement in the scene having the background and the occurrence of gas, the computer program product comprising code portions adapted to control a processor to perform the method of claim 1.

10. The method according to claim 1, further comprising storing, in a buffer memory, information indicative of the edge of the gas in the imaged scene at each point of time.

11. A system for indicating gas movement in a scene having a background and an occurrence of gas, the system comprising an input and a processor, wherein the input is adapted to obtain a sequence of at least two thermal image frames of said scene recorded at different points of time, and the processor is adapted to:
automatically identify, in each image frame of said sequence of thermal image frames, a set of pixel coordinates representing gas above a predetermined concentration threshold present in the imaged scene at the point of time at which the image frame was recorded;
automatically determine a location of each of said sets of pixel coordinates in the imaged scene;
perform edge detection on each of said sets of pixel coordinates to determine, for each set of pixel coordinates of said sets of pixel coordinates, a respective location in the imaged scene of an edge of the gas at the point of time associated with said set of pixel coordinates; and
generate a visual presentation image of said scene in which the location of the edge of the gas in the imaged scene at each point of time is visualized in the visual presentation image.

12. The system according to claim 11, wherein the processor is further adapted to:
automatically determine a direction of gas movement based on the location of each of said sets of pixel coordinates in the imaged scene;
automatically determine at least one potential location of a gas source based on said determined location of each of said sets of pixel coordinates and said determined direction of gas movement.

13. The system according to claim 11, wherein the processor is configured to use information about the background of the imaged scene in said determination of at least one potential location of a gas source, wherein the information comprises information about objects in the scene with a potential to leak gas, and wherein the processor is further adapted to visualize said at least one potential location of said gas source in said visual presentation image of said scene.

14. The system according to claim 11, wherein the processor is further adapted to automatically determine a direction of gas movement based on the location of each of said sets of pixel coordinates in the imaged scene, and wherein the visual presentation image includes arrows pointing in the direction of gas movement.

15. The system according to claim 11, wherein each of said sets of pixel coordinates is visualized in the visual presentation image using a range of colors and/or greyscales.

16. The system according to claim 11, wherein:
each of said sets of pixel coordinates only comprises pixels which together form a continuous area in the image;
for each of said sets of pixel coordinates, the edge of the gas at the point of time associated with said set of pixel coordinates is formed of edge pixels of said sets of pixel coordinates.

17. The system according to claim 11, wherein:
a plurality of different sets of pixel coordinates, each representing gas above a specific concentration threshold, are identified in each image frame; and
said plurality of different sets of pixel coordinates, representing gas above different concentration thresholds, are visualized in the same visual presentation image.

18. The system according to claim 11, wherein said visual presentation image also visualizes the background of said scene.

19. The system according to claim 11, wherein said visual presentation image of the scene is a live video image.

20. The system according to claim 11, further comprising a buffer memory, wherein the buffer memory comprises a first-in first-out (FIFO) memory, wherein said sequence of thermal image frames is stored in said buffer memory, and wherein the FIFO memory is selected to store the sequence of thermal image frames in response to detection of the gas.

* * * * *

UNITED STATES PATENT AND TRADEMARK OFFICE
CERTIFICATE OF CORRECTION

| | |
|---|---|
| PATENT NO. | : 11,092,507 B2 |
| APPLICATION NO. | : 16/279840 |
| DATED | : August 17, 2021 |
| INVENTOR(S) | : Lucas Ekeroth |

It is certified that error appears in the above-identified patent and that said Letters Patent is hereby corrected as shown below:

In the Specification

In Column 6, Line 12, change "accordance is with" to --accordance with--.

In Column 16, Line 1, change "non-transitory" to -- -non-transitory--.

In Column 16, Line 4, change "non-transitory" to -- -non-transitory--.

In the Claims

In Claim 12, Column 18, Line 21, change "imaged scene;" to --imaged scene; and--.

Signed and Sealed this
Seventh Day of June, 2022

Katherine Kelly Vidal
*Director of the United States Patent and Trademark Office*